(12) United States Patent
Lewis et al.

(10) Patent No.: US 11,921,809 B2
(45) Date of Patent: *Mar. 5, 2024

(54) GENERATING HIGH VISIBILITY SOCIAL ANNOTATIONS

(71) Applicant: Google LLC, Mountain View, CA (US)

(72) Inventors: Justin Lewis, South San Francisco, CA (US); Gavin James, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,823

(22) Filed: Aug. 29, 2022

(65) Prior Publication Data

US 2022/0414180 A1 Dec. 29, 2022

Related U.S. Application Data

(63) Continuation of application No. 14/689,893, filed on Apr. 17, 2015, now Pat. No. 11,429,689.

(60) Provisional application No. 61/982,171, filed on Apr. 21, 2014.

(51) Int. Cl.
*G06F 16/00* (2019.01)
*G06F 16/955* (2019.01)
*G06F 16/957* (2019.01)
*G06Q 50/00* (2012.01)
*H04L 67/50* (2022.01)

(52) U.S. Cl.
CPC ...... *G06F 16/9577* (2019.01); *G06F 16/9558* (2019.01); *G06Q 50/01* (2013.01); *H04L 67/535* (2022.05)

(58) Field of Classification Search
CPC ............. G06F 16/9577; G06F 16/9558; H04L 67/535; G06Q 50/01

USPC ................................................ 707/600–899
See application file for complete search history.

(56) References Cited

U.S. PATENT DOCUMENTS

| 8,918,404 B1 | 12/2014 | Dachille |
| 8,983,948 B1 | 3/2015 | Haugen et al. |
| 9,081,825 B1 * | 7/2015 | Rodriguez ............ G06Q 50/01 |
| 9,798,450 B1 | 10/2017 | Urasaki et al. |

(Continued)

OTHER PUBLICATIONS

Notice of Allowance dated Apr. 21, 2022 in U.S. Appl. No. 14/689,893.

(Continued)

*Primary Examiner* — Michelle N Owyang
(74) *Attorney, Agent, or Firm* — Shumaker & Sieffert, P.A.

(57) ABSTRACT

Systems and methods for generating social annotations for content that are capable of being seen by a broad audience are provided herein. A system can include a user identification component configured to identify a user that has potential for generating a valuable endorsement of a content item based at least in part on a sharing setting associated with a user. The system further includes an audience component configured to determine an audience associated with the user based at least in part on the sharing setting, a user selection component configured to select the user as a candidate user for generating the endorsement of the content item in response to a determination that a size of the audience exceeds a threshold, and a targeted content component configured to, in response to selection of the user, provide the content item to the user with a capability to endorse the content item.

21 Claims, 10 Drawing Sheets

(56) References Cited

U.S. PATENT DOCUMENTS

| | | | |
|---|---|---|---|
| 2008/0065481 A1 | 3/2008 | Immorlica et al. | |
| 2009/0089361 A1 | 4/2009 | Womack et al. | |
| 2009/0106307 A1 | 4/2009 | Spivack | |
| 2009/0271289 A1 | 10/2009 | Klinger et al. | |
| 2012/0084160 A1* | 4/2012 | Badros | G06Q 30/0241 705/14.73 |
| 2012/0209674 A1* | 8/2012 | Neystadt | G06Q 30/0207 705/14.16 |
| 2012/0290950 A1 | 11/2012 | Rapaport et al. | |
| 2013/0013682 A1* | 1/2013 | Juan | G06Q 50/01 709/204 |
| 2013/0346330 A1 | 12/2013 | Fleischman et al. | |
| 2013/0346877 A1 | 12/2013 | Borovoy et al. | |
| 2015/0127565 A1 | 5/2015 | Chevalier et al. | |
| 2015/0142555 A1* | 5/2015 | Zheng | G06Q 30/0244 705/14.46 |
| 2015/0220996 A1* | 8/2015 | Bhamidipati | G06Q 50/01 705/14.66 |

OTHER PUBLICATIONS

Office Action dated Apr. 7, 2017 in U.S. Appl. No. 14/689,893.
Office Action dated Apr. 20, 2020 in U.S. Appl. No. 14/689,893.
Office Action dated Jun. 6, 2019 in U.S. Appl. No. 14/689,893.
Office Action dated Aug. 28, 2018 in U.S. Appl. No. 14/689,893.
Office Action dated Oct. 20, 2017 in U.S. Appl. No. 14/689,893.

* cited by examiner

GENERATING HIGH VISIBILITY SOCIAL ANNOTATIONS

CROSS-REFERENCE TO RELATED APPLICATIONS

This application is a continuation of U.S. patent application Ser. No. 14/689,893, filed Apr. 17, 2015, which claims the benefit of U.S. Provisional Patent Application No. 61/982,171 filed Apr. 21, 2014, each of which is hereby incorporated by reference herein in its entirety.

TECHNICAL FIELD

This disclosure generally relates to generating social annotations for content that are capable of being seen by a broad or targeted audience.

BACKGROUND

Web based social interactions produce a wealth of signals that can facilitate finding and recommending appropriate content for users. For example, various social network services allow users to endorse content they come across by marking the content as liked, commenting on the content, sharing the content, subscribing to the content, etc. Such user endorsements of content provides a key pillar for socially connected sites in terms of generating more content views, interactions, and even subscribers. All of these things are vital for keeping an Internet based social network running at full steam and for delivering advertisements effectively. Generating these endorsements in massive quantities and in a way that they can be used publicly is vital for the future of all of these services.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
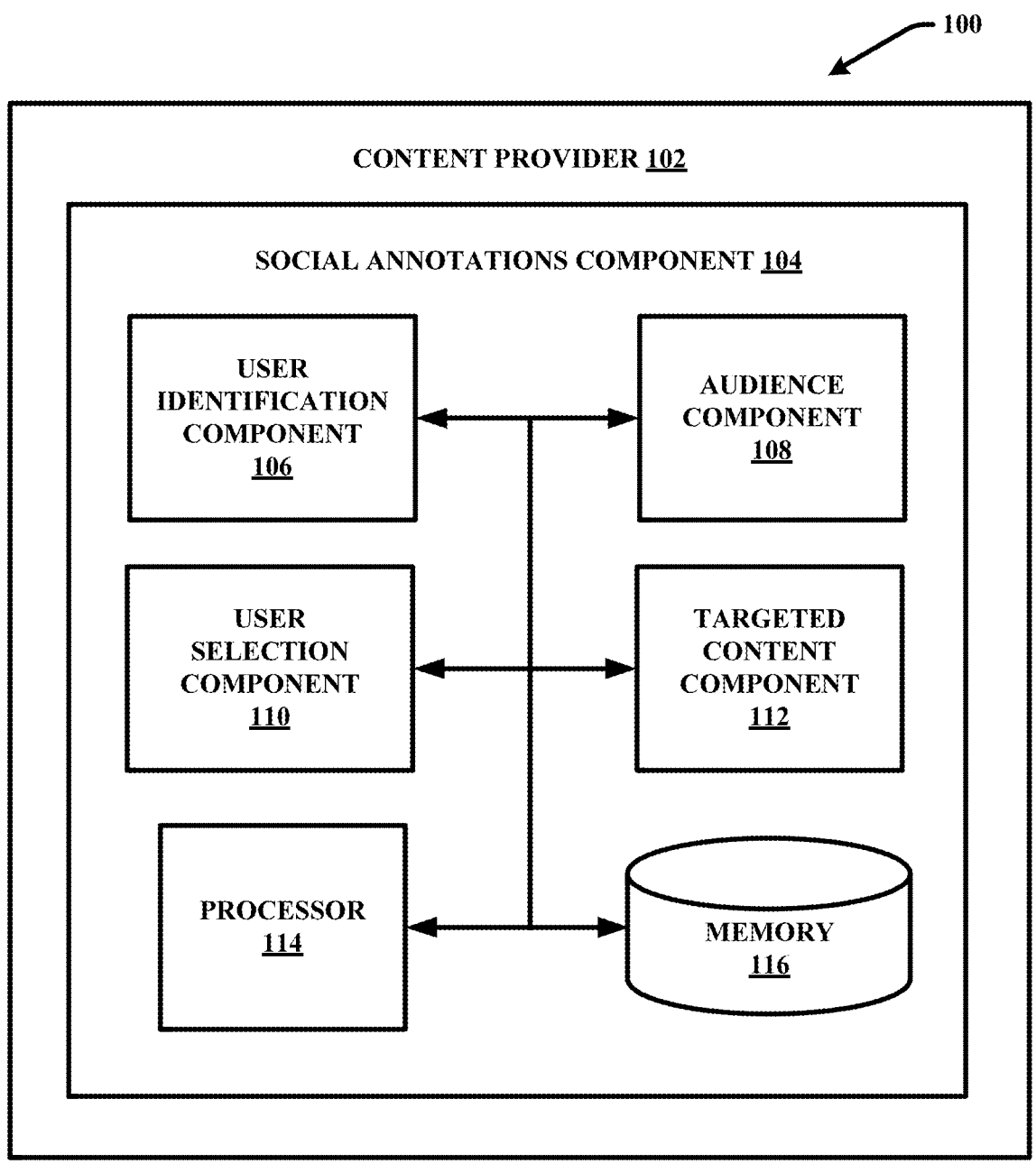
FIG. 1 illustrates a high-level block diagram of an example system that facilitates receiving user endorsements for a content item that have a relatively high social annotation value in accordance with certain embodiments of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing this disclosure.

By way of introduction, the subject matter described in this disclosure relates to systems and methods for generating valuable social annotations that reach a wide or targeted audience. The term social annotation is used herein to refer to visible (and/or audible) data associated with a content item (e.g., a photo, a video, an article, a feed post, a comment, a webpage, an advertisement, etc.) that indicates a level of endorsement of the content item by at least one user. The data can include text, images, symbols, video, audio, hyperlinks, etc. For example, a social annotation can include a tag associated with a content item that identifies a list of other users that endorse the content item. In another example, a social annotation can include an image, an animation, or a video that identifies one or more other users that endorse the content item.

Generally, users tend to trust and access content items that their friends or social network acquaintances recommend or otherwise endorse. For example, a user may watch a video because several of his friends indicated that they liked the video. Accordingly, by providing a social annotation with the video that identifies several of the user's friends who liked the video, the user will be more inclined to watch the video. There are various ways for users to indicate their endorsement of a content item that can be used to generate social annotations for the content item. For example, a user can explicitly mark a content item as liked, comment on the content item, review the content item, rate the content item, share the content item, or subscribe to the content item. A user can also implicitly indicate his or her endorsement of a content item by accessing or repeatedly accessing the content item (e.g., watching or repeatedly watching a video) or performing an action based on the content item (e.g., purchasing a product based on viewing of an advertisement for that product).

However, not all user endorsements provided for or associated with a content item can be used to generate a social annotation for the content item. This is because many users implement privacy settings that restrict what other users can receive or access information regarding what content items the users endorse. For example, a user John may not want just anyone to know what content items he likes, or otherwise endorses. According to this example, John may set access control parameters that authorize only a particular group of users associated with one or more defined attributes are authorized to receive/access information indicating what content items John endorses. For example, the access control parameters can define authorized users as those who included in a particular social circle (being one or John's friend on a particular social network), those who have a particular demographic (e.g., age, gender, ethnicity, etc.), or those who belong to a particular class (top followers or fans).

Therefore, before endorsement information provided by a user for a content item can be used to generate a social annotation for the content item, one must first determine the other user to whom the content item/social annotation will be presented and whether the user has authorized the other user to receive/access information regarding the user's endorsement of the content item. It can thus be appreciated that content item endorsements provided by users that authorize little or no other users to receive/access information regarding their endorsement of the content items will have little or no value with respect to generating impactful social annotation for the content items.

The subject disclosure provides a mechanism for identifying users who are prime candidates for generating content item endorsements that can specifically be used to generate social annotations that can be presented to a large and/or targeted audience of users. In one or more embodiments, prime candidate users are those that are associated with a large audience and that have authorized a large population of the audience members to receive/access information regarding their endorsement of content. In various aspects, prime candidate users are initially identified and selected based on privacy settings they have instituted restricting what other users are authorized to receive or access information indicating their endorsement of a content item. For example, those users that have implemented privacy settings which allow a large audience to receive/access their content endorsements can be selected over those users which have implemented privacy settings that allow few or no other users to receive/access information indicating their content endorsement. In addition, prime candidate users can be identified based on association with a large audience. For example, those users with large social circles are preferred over users with small social circles.

In some embodiments, a social annotation for a content item is desired to facilitate welcoming reception and consumption of a content item by a particular type of audience (e.g., a targeted audience). For example, an advertiser may want to provide an advertisement to users that exhibit an affinity for the product advertised by the advertisement. Such an affinity can be determined using various known metrics and mechanisms (e.g., user content consumption history, user bucketing based on similar preferences/characteristics, etc.). According to these embodiments, a set of candidate users are identified that are associated with audiences including users that exhibit an affinity for a particular content item (e.g., the advertisement based on the product advertised by the advertisement). For example, the set of candidate users can include users with a high amount (e.g., with respect to a threshold amount) of friends, followers, subscribers, etc., that exhibit an affinity for the content item. This set of candidate users is further restricted based on their privacy settings. For example, the users in the set are further analyzed to determine an amount of the users' audience members exhibiting the high affinity for the content item that are also authorized to receive/access information regarding the candidate users' endorsement of the content item. Those candidate users having a large number of audience members exhibiting an affinity for the content item and being authorized to receive/access the users' endorsement of the content item are selected as primed candidates.

After a prime candidate user is identified, a content item for which a social annotation is desired is pushed to the candidate user in hopes of receiving an endorsement from the candidate user for the content item. In various embodiments, additional analysis is employed to further filter candidate users based on inferences regarding likelihood of endorsement of the content item and likelihood of provision of a particularly desired type of endorsement (e.g., sharing vs. liking). In response to endorsement of the content item by the user, (e.g., a marking of the content item as liked, a share of the content item, a comment on the content item, etc.), information regarding the endorsement is received. For example, the information can identify the user that provided the endorsement, the type of endorsement the user provided, and the content item that the user endorsed. Social annotation information can then be associated with the content item (e.g., as metadata, in a reference index, etc.) that identifies at least the user that endorsed the content item, the set of users included in the user's audience that are authorized to receive/view the social annotation. When the content item is later provided to a member of the user's audience, a social annotation can be applied and presented with the content item that identifies the user as having endorsed the content item.

The subject systems and methods do not merely recite the performance of some business practice known from the pre-Internet world along with the requirement to perform it using a computer on the Internet. Instead, the solution is necessarily rooted in computer technology in order to overcome a problem specifically arising in the realm of computer networks. In particular, the subject solution is specifically targeted to the goal of increasing viewership and consumption of Internet based content items (e.g., videos, postings, advertisements, websites, channels, applications, etc.) based on social annotations. More specifically, the subject disclosure addresses the various challenges associated with achieving this goal that are particular to the Internet, including finding suitable users to target with a content item that can provide endorsements for the content item that can be used to generate a valuable social annotation for the content item. With the subject systems and methods, suitable candidate users are automatically identified for targeting content items in association with generating social annotations for the content items based on metrics that are unique to consumption/usage of an Internet based entities. As a result, content items can be associated with social annotations that are highly valuable because they have the potential to influence (e.g., be seen by) a wide number of users or a targeted set of users.

In an embodiment, a system can include a user identification component configured to identify a user that has potential for generating a valuable endorsement of a content item based at least in part on a sharing setting associated with a user, wherein the sharing setting indicates one or more criteria required for users authorized to receive information indicating content endorsed by the user. The system further includes an audience component configured to determine an audience associated with the user based at least in part on the sharing setting, a user selection component configured to select the user as a candidate user for generating the endorsement of the content item in response to a determination that a size of the audience exceeds a threshold, and a targeted content component configured to, in response to selection of the user, provide the content item to the user with a capability to endorse the content item.

In another embodiment, a method is provided that includes identifying, by a system comprising a processor, a set of users having potential for generating a valuable endorsement of a content item based at least in part on a sharing settings associated with respective users of the set, wherein the sharing settings indicate one or more criteria required for users authorized to receive information indicating content endorsed by the respective users. The method further includes determining, by the system, audiences associated with the respective users based at least in part on the sharing settings, and selecting, by the system, a subset of the respective users of the set for generating the endorsement of the content item in response to a determination that a size of audiences of respective users of the subset exceeds a threshold. In addition, the method includes providing, by the system in response to the selecting the subset, the content item to the respective users of the subset with a capability to endorse the content item.

In yet another embodiment, a non-transitory computer readable storage medium is provided having computer-executable instructions, that in response to execution, cause a computing system to perform various operations. These operations can include identifying a user that has potential for generating a valuable endorsement of a content item based at least in part on a sharing setting associated with a user, wherein the sharing setting indicates one or more criteria required for users authorized to receive information indicating content endorsed by the user. These operations further include determining an audience associated with the user based at least in part on the sharing setting, selecting the user as a candidate for generating the endorsement of the content item in response to a determination that a size of the audience exceeds a threshold, and sending, in response to the selecting, the content item to the user with a capability to endorse the content item.

Referring now to the drawings, with reference initially to FIG. 1, presented is a diagram of an example system 100 that facilitates receiving an endorsement of a content item that has relatively high social annotation value in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes a content provider 102 and a social annotations component 104. Social annotations component 104 is configured to facilitate receiving user endorsements for content items provided by content provider 102 that have relatively high social annotation value. Social annotations component 104 can further employ the endorsements to generate a social annotation for the content item that is capable of being received/viewed by a large or targeted audience. The purpose of a social annotation is to encourage or entice another user to select, consume, or otherwise act upon the content item associated with the social annotation. Accordingly, the more users and/or the more of a specifically targeted set of users that can be influenced by a social annotation, the higher its value.

In one or more embodiments, social annotations component 104 can include user identification component 106, audience component 108, user selection component 110, and targeted content component 112. Social annotations component 104 can also include memory 116 that stores computer executable components, and a processor 114 that executes the computer executable components stored in the memory (e.g., the user identification component 106, the audience component 108, the user selection component 110, and the targeted content component 112).

Although social annotations component is depicted as an element internal to content provider 102, it should be appreciated that social annotations component 104 or one or more components of social annotations component 104 can be located external to content provider 102. Further, content provider 102, social annotations component 104, and/or one or more components of social annotations component 104 can be connected either directly or via one or more networks, (not shown). Such network(s) can include wired and wireless networks, including but not limited to, a cellular network, a wide area network (WAD, e.g., the Internet), a local area network (LAN), or a personal area network (PAN).

Content provider 102 can include an entity configured to provide content or content items to a user at a client device (e.g., not shown) via a network (e.g., the Internet). For example, content provider 102 can include a website or application configured to present pictures, articles, blogs, videos, webpages, user profile pages, applications, websites, or any other type of content item, to client devices via a network. According to this example, the content provided by the website or application can be configured for downloading, streaming or merely viewing at a client device via the network. In another aspect, content provider 102 can include an information store that provides access to data included in the information store via a network.

As used herein, the term content item refers to any suitable data object that can be linked to and accessed or otherwise shared via a network and includes but is not limited to: documents, articles, messages, website, webpages, programs, applications, user profiles, advertisements and media items. In an aspect, a content item includes a data object that can be identified by a URL. The term media content or media item can include but is not limited to streamable and dynamic media (e.g., video, live video, video advertisements, music, music videos, sound files, animations, and etc.) and static media (e.g., pictures, thumbnails). The term media content or media item can also refer to a collection of media items such as a playlist including several videos or songs, or a channel including several videos or songs associated with a single media creator or curator.

In an exemplary embodiment, content provider 102 is an Internet based streaming media provider configured to provide streamed media to client devices over a network. For example, content provider 102 can include a media provider that has access to a voluminous quantity (and potentially an inexhaustible number) of shared media (e.g., video and/or audio) files. The media provider can further stream these media files to one or more users at respective client devices of the one or more users over a network. The media can be stored in memory associated with the media provider and/or at various servers employed by the media provider and accessed by client devices using a networked platform (e.g., a website platform, a cellular application) employed by the media provider. For example, the media provider can provide and present media content to a user via a website that can be accessed by a client device using a browser. In another example, the media provider can provide and present media to a user via a mobile/cellular client application provided on a client device (e.g., where the client device is a smartphone or the like).

In an aspect, the media provider can facilitate video sharing between users in a social networking environment. For example, respective users can establish profiles with the media provider and connect with other users sharing similar media interests. In addition, users can establish their own channels which serve as avenues via which they share their own media (e.g., media created, collected or otherwise associated with ownership by the user). As used herein, the term channel refers to data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

Various aspects of system 100 and the like are described herein in association with receiving and employing valuable user endorsements for media items, where content provider 102 is a streaming media provider configured to provide the media items. For example, social annotations component 104 is exemplified in association with receiving valuable user endorsements of a video or channel provided by a streaming media provider and employing the endorsement to generate a social annotation for the video or channel. The social annotation is further employed to facilitate encouraging other users related to watch the video or subscribe to the channel. However, it should be appreciated that various aspects of system 100 and the like can be employed to facilitate generating valuable social annotations for various type of content items.

User identification component 106 is configured to identify candidate users of content provider 102 that have potential for generating a valuable endorsement of a content item. The larger the audience of users likely to receive or access information regarding view a user's content item endorsement, the more valuable it becomes. Accordingly, a content item endorsement provided by a user affiliated with a large and active group of users (e.g., friends, followers, subscribers, etc.) at one or more social networks/communities is more valuable than a content item endorsement by a user that is only affiliated with a small group of users. However, even if a user is affiliated with a large group of users, the users may not be able to receive or view information regarding the user's endorsement of a content item based on privacy settings implemented by the user. Therefore, in various embodiments, user identification component 106 is configured to identify candidate users based at least in part on a sharing settings associated with the candidate users, wherein a sharing setting indicates one or more criteria required for users authorized to receive information regarding content endorsed by another user.

In particular, content provider 102 can be, include or be associated with a social networking system/service wherein respective users of content provider 102 can become associated with an audience base. For example, respective users of content provider 102 can establish user profiles or accounts via which the respective users can connect with other users and publicize or share information with the other users. For example, a user may share personal information, pictures, videos, songs, messages, life events, etc. The respective users can develop social networks or circles by associating themselves with other users of the social networking system, such as by becoming friends with other users, following other users, subscribing to other users, etc. In addition, users of content provider 102 can belong to a plurality of different social networks systems/services and likewise be associated with a plurality of different audiences or user groups.

As used herein, the term social network refers to a group of other users a given user is associated with via an Internet or cellular communication based social networking system. For example, a users social network can include those users the user is friends with on social media network, those users that subscribe to the users media channel, and those users included in the user's phone contacts.

Social network systems/services, such as one employed by content provider 102, generally include privacy/sharing settings that enable users to restrict what type of information is published via their respective profiles/user accounts and to whom such information is visible or provided to in association with their user accounts/profiles. For example, when a user publishes a new photo or video via his or her social network profile at a social networking system, the user can select what other user of the social networking system can see the photo. According to this example, the user may allow any user to view the photo, only the users friends to view the photo, only a select group of the user's friends to view the photo, or only the user himself to view the photo.

In another example, when a user endorses a content item in association with the user's social networking system identity, via privacy/sharing settings provided by the social networking system, the user can restrict what other users will receive (e.g., via a notification, a feed item, etc.) or have access to (e.g., via information included on the user's profile/account page) information regarding the endorsement. For example, when a user shares a content item (e.g., a video, an advertisement, a comment, a product purchase, etc.), on his or her social networking profile page, the user can choose what other users can see the share. In another example, when a user likes a content item or comments on a content item in association with his or her social network identity, the user can decide what other users are authorized to receive information regarding the user's like of the content item or the user's comment on the content item.

In one or more aspects, in association with implementing privacy settings regarding what other users can receive or have access to information regarding a user's endorsement of a content item, the user can set his or her privacy settings to "public," "private," or a more personalized setting somewhere between public and private. For example, a setting of "public" can indicate that any other user of the social networking system/service can receive or access information indicating the user's endorsement of a content item. In another aspect, a user can set his or her privacy settings to "private" to indicate that no other user (aside from the user himself or herself) can receive or access information indicating the user's endorsement of a content item.

In other aspects, the user can set a privacy setting that identifies one or more criteria for another user that is authorized to receive or access information indicating the user's endorsement of a content item. For example, the one or more criteria can relate to a user association or classification. According to this example, the association could include being a member of the user's social network (e.g., being a friend, a follower, a subscriber, etc.), or belonging/not belonging to a particular user group/subset within the user's social network (e.g., being a family member, being a college friend, not being a work colleague, etc.). In another example, the one or more criteria can defined a specific set of characteristics of an authorized user, such as a particular demographic characteristic (age, gender, occupation, etc.) or a particular user preference (e.g., being a sports fan, being a Republican, being a fan of a particular famous actor, etc.). Still in yet another aspect, the user can set a privacy setting that restricts what other users can access or receive information regarding the user's endorsement of a content item based on one or more characteristics of the content item. For example, the user can allow all any users to know that the user endorsed a video classified as educational, yet restrict those users that can know when the user endorsed a video classified as politically liberal.

In one or more embodiments, user identification component 106 can identify a set of candidate users belonging to a networking system/service employed by content provider 102 that have privacy/sharing settings for their user accounts/profiles satisfying a predetermined criteria (wherein a privacy/sharing settings defines one or more criteria required for users authorized to receive information indicating content endorsed by the user. In an aspect, the criteria can set a low threshold and require the privacy/sharing settings authorize at least one other users to be able to receive or access information regarding the user's endorsement of a content item. In another aspect, can set a high threshold and require a user's privacy/sharing settings to be "public." In another aspect, user identification component 106 can be configured to exclude any user whose privacy/sharing settings are "private".

In another aspect, the criteria can require a user's privacy/sharing settings authorizes at least a threshold number (e.g., 10, 50, 100, 1000, etc.) of other users to be able to be able to receive or access information regarding the user's endorsement of a content item. For example, a user's privacy/sharing settings can define the authorized users as those which belong to the user's social network of the social networking system employed by content provider 102 or a subset of the user's social network members that are older than 18. According to this example, if the user's audience of authorized users exceeds the threshold requirement, the user can be included in a set a candidate users. In another aspect, user identification component 106 can apply selection criteria that require a user's privacy/sharing settings authorize a particular other user (e.g., user Tommy Jones), or a particular type of user (e.g., the user's top fans/followers, users over the age of 18, users located in Japan, etc.) to receive or access information regarding the user's endorsement of content.

In various embodiments, a user can belong to multiple social networking systems. For example, the user can belong to a first social networking system/service provided by content provider 102 and a second social networking system/service provided by another entity. The user can also link his or her social networks from both the first system and the second system. For example, the user can authorize actions performed by the user, such as endorsing a particular media item, to become a feed item or notification at the second social networking system. According to this embodiment, the user's privacy/sharing settings can define criteria for other users that are authorized to receive or access information regarding the user's endorsement of a content item of content provider 102, wherein the criteria can relate to members of the first social networking system and/or the members of the second social networking system. For example, the user can authorize his or her friends/social network members of both the first and second social networking systems to receive/access information regarding the user's endorsement of a content item provided by content provider. With this embodiment, a particular user's audience can include members of different social networks to which the user belongs, and thus expand. According to this embodiment, user identification component 106 can also identify those users whose audience of authorized users exceeds a threshold number requirement and/or include a particular user or type of user.

Audience component 108 is configured to analyze the audiences of candidate users included in a set identified by user identification component 106 to determine or characterize a size and/or distribution of the audiences. In an aspect, audience component 108 can rank or rate candidate users based on their audiences, wherein candidate users having larger audiences or audiences of particularly desired distribution (e.g., based on the implementation of system 100 and the like) are ranked or rated higher. As used herein, a user's "audience" specifically refers to the set of users that are authorized and capable of receiving and/or accessing information regarding a user's endorsement of a content item.

In an aspect, audience component 108 can determine or infer a number of members of a candidate user's audience. For example, when a user's audience includes all members of the user's social network or a defined subset of members of the user's social network, audience component 108 can determine the number of users included in the user's audience. Naturally, this number can grow as the number of users in the user's social network grows. In another example, when a user's audience is based on a sharing/privacy setting of "public," audience component 108 can infer a number of members included in the user's audience based on the number of user's in the users social network and the amount of public (e.g., non-subscribing) traffic associated with the user's profile/account.

In various embodiments, system 100 can be applied to develop social annotations that will be used to influence a particular group of users to select, consume, watch (where the content item is video), subscribe to, or otherwise interact with a specific (know) content item. With these embodiments, candidate users with an audience base having a high distribution of members having a particular characteristic is preferred. In an aspect, the particular characteristic can include a predetermined preference or affinity to the specific content item. For example, when the content item is an advertisement for a new television series, candidate user's that have an audience base that have been determined to have an affinity for the new television series (e.g., based on various metrics such as user preferences and user bucketing) are preferred. Accordingly, audience component 108 can analyze the members of candidate users' audiences and identify subsets of members of the respective audiences that have the desired affinity for the particular content item. Those candidate users having subsets with a greater number of users can receive a higher ranking or priority.

Audience component 108 can also generally determine or classify the distribution of a candidate users' audience base with respect to various other parameters. For example, audience component 108 can determine the distribution of a user's audience base with respect to a particular user demographic, or a particular user preference. According to this example, depending on the content item for which an endorsement is desired, those candidate users having a higher audience distribution of a particular demographic or user preference is preferred.

In another aspect, audience component 108 can determine the distribution of candidate users' audiences with respect to level of engagement or traffic of the respective members with the user's profile/account. For instance, audience component 108 can determine that a first candidate user has 100 audience members wherein 20% are considered highly engaged or active with the user's account/profile (e.g., 20% regularly view the user's profile). Audience component 108 can also determine that a second candidate also having 100 audience members has 40% engaged/active members. According to this example, the second candidate user is preferred over the first candidate user because a content item endorsement provided by the second candidate user can be used to generate a social annotation for the content item that is capable of being seen by a greater number of total users.

User selection component 110 is configured to select a subset (e.g., one or more) of the candidate users to send or provide a content item to with the intention of receiving an endorsement of the content item. In various embodiments, user selection component 110 can be configured to select a subset of the candidate users bases on size and/or distribution of their audiences. In an aspect, user selection component 110 can select a subset of the candidate users that have a number of audience members exceeding a threshold amount. In another aspect, user selection component 110 can select a subset of the candidate users that have a threshold amount of audience members belonging to a particular group or having a particular characteristic. For example, user selection component 110 can select a subset of the candidate users based on those having a threshold number or distribution (e.g., percentage) of audience member having a particular affinity for a known content item, having a particular demographic characteristic, or having a particular preference. In another aspect, user selection component 110 can select a subset of the candidate user based on those users having threshold number or distribution of users considered active or highly engaged.

In some embodiments, in addition to a candidate user's audience size and/or distribution, user selection component 110 can consider various characteristics of the candidate user in association with including the candidate user in the subset of candidate users to send targeted content to with the intention/hope of receiving an endorsement therefrom. Such characteristics can reflect an inferred degree of confidence that the candidate user is likely to endorse the targeted content. With these embodiments, user selection component 110 can receive information regarding a candidate user's endorsement history, wherein a candidate user's endorsement history can include information regarding frequency of content endorsement by the user, a characteristic of content endorsed by the user, or a type of content endorsement frequently provided by the user. For example, a candidate user that has a large and active audience base yet rarely ever endorses any content will provide little value or no value for a system wherein value is based on the number of other users that are capable of receiving information regarding the user's endorsement of a content item. Thus user selection component 110 can be configured to select those candidate users that more frequently endorse content relative to the other candidate users.

In another aspect, when a known content item is to be sent to the selected subset of candidate users in hopes of having the subset of candidate users endorse the content item, user selection component 110 can be configured to select those candidate users that demonstrate a higher probability of endorsement of the content item based on a correlation between characteristics/preferences of the user and the type of content of the content item. For example, if the content item is video advertisement related to football, user selection component 110 can select a subset of the candidate users that tend to watch and endorse content related to football or sport in general over users that do not tend to watch and endorse content related to football or sports.

Still in yet another aspect, a candidate user's privacy/sharing settings can restrict the type of endorsements another user is authorized to receive information about. For example, a user may allow all users of his social network to see information regarding content items he likes but not information regarding content items he subscribes to. Accordingly, if the user subscribes to a content item but does not like it, the content item will not receive an endorsement from the user and thus will not receive a social annotation for the user. In some aspects, user selection component 110 can be configured to weight such variances (with respect to type of endorsements that audience members are authorized to view), in a user's privacy settings when determining whether to select the user as a prime user for which to send targeted content. For example, user selection component 110 can associate those candidate users that restrict they type of endorsements their audience based is authorized to view with a lower priority or ranking than those candidate users that do not apply such a restriction.

In various embodiments, user selection component 110 can rank candidate users based on a valuation of the respective candidates in consideration of one or more of the factors described above (e.g., audience size, audience distribution, audience engagement/traffic, content item to be endorsed, user endorsement history, etc.). The valuation can reflect a probability that the candidate user with provide an endorsement for a content time that can be used to generate an annotation for the content item, and a degree of usefulness/impact the social annotation will provide. The user selection component 110 can then select a subset of the candidate users associated with a valuation exceeding a threshold value.

Targeted content component 112 is configured to provide a content item to a selected subset of the candidate users with a capability to endorse the content item. In some aspects, as discussed above, the subset of users are selected based on the particular content item the targeted content component 112 has been configured to provide. In other aspects the subset of users can include users determined to be strong candidates for generating social annotations for any content item in general.

For example, targeted content component 112 can present a content item to a selected user (as selected by user selection component 110) as a recommended content item, in a notification, in an electronic message, in a feed item, etc. In association with provision of the content item, targeted content component 112 can provide or enable a mechanism via which the user can endorse the content item. For example, targeted content component 112 can allow the user to provide input indicating whether the user likes or dislikes the content item. Targeted content component 112 can also allow a user to comment on the content item, provide a review of the content item, rate the content item, share the content item, or otherwise provide a form of public expression that indicates the user endorses the content item.

In various embodiments, the content item that is targeted by targeted content component 112 to a selected subset of candidate users, with the intention of receiving an endorsement from the respective subset of candidate users, is an advertisement. Targeted advertisements can include videos, texts, images, hyperlinks, or other advertisement content that can be presented to a user. In an example, a targeted advertisement can include a video advertisement. The video advertisement can be rendered in a list of videos for a user to select and view, as a feed item, as an in-stream video advertisement, or in another suitable form.

In some embodiments, in association with sending or providing a content item to a targeted user (e.g., a user included in a subset of candidate users selected by user selection component 110), targeted content component 112 can generate and include an invitation with the content item. The invitation can invite or prompt the user to provide feedback associated with content. For example, the invitation can invite a user to provide input that ranks (e.g., based on a suitable scale, such as a star rating, a number rating, etc.), reviews, or otherwise endorses the content. In some aspects, the invitation can offer the user a reward in return for provision of the endorsement. For example, the reward could include a monetary reward, a coupon, or some form of benefit associated with usage of content provider 102.

In an aspect, users that are not selected to receive or view targeted content will not be presented with the targeted content. These users may represent users who do not wish to share content and may have a negative experience if presented with the targeted content. Accordingly, if these users are not targeted, then satisfaction can be increased and response rates can improve.

Figure 2:
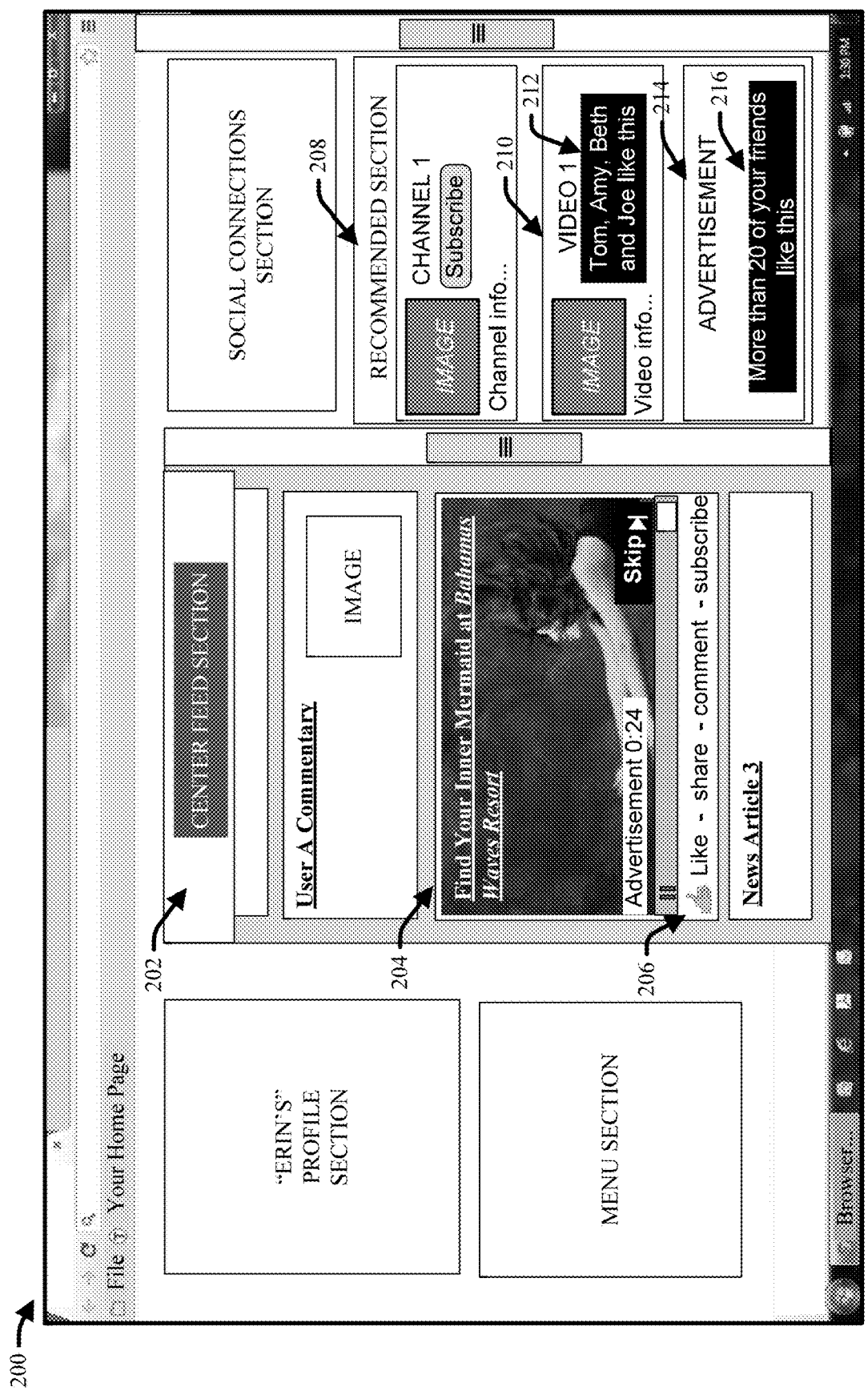
FIG. 2 presents an example graphical user interface including a content item capable of being endorsed and a content item with a social annotation associated therewith, in accordance with certain embodiments of this disclosure.

FIG. 2 presents an example graphical user interface 200 including a content item capable of being endorsed and a content item with a social annotation associated therewith, in accordance with certain embodiments of this disclosure. Interface 200 displays an example view of a user account/profile webpage or application page established by a user in association with usage of a content provider, such as content provider 102. For ease of explanation, the account/profile page is for a user named "Erin." The user account/profile webpage can facilitate interaction and usage of the various services and content provided by the content provider. For example, the user account/profile can be established with a streaming media provider that provides streaming media and related services to users. In another example, the user account/profile can be established with a social networking system/service.

In various aspects, the content provider can provide and/or be affiliated with a social networking system/service that allows users of the content provider to establish network identities via their respective user accounts/profiles and employ their network identities to perform various social interactions with other users. For example, the social interactions can include but are not limited to: connecting with other users, communicating with other users, collaborating with one another, establishing social networks and groups, sharing information with one another, sharing media/multimedia with other users (e.g., videos provided by their channel), and receiving updates or notifications regarding activities, actions, preferences, etc., of other users. The social interactions can be associated with usage of the content provider (e.g., chatting about videos provided by the streaming media provider, subscribing to channels provided by users of the streaming media providers, etc.), and/or the social interactions can be associated with usage of another content provider/service.

As previously described, the social networking system provided by and/or associated with the content provider can include sharing/privacy settings that allow respective users to set sharing settings regarding what information is made available to and/or provided to other users in association with their respective user accounts/profiles. In particular, with respect to social annotations, the respective users can implement sharing settings that define what other users are authorized to receive information regarding their endorsement of content. For example, Erin can set sharing settings that define one or more attributes of other users that are authorized to receive and/or access information regarding the Erin's endorsement of content. The settings can also allow Erin to specify characteristics of the content and/or characteristics of the type of endorsement.

User interface 200 includes various sections via which user account/profile information is organized. The relevant sections of interface 200 include center feed section 202 and recommended section 208. Center feed section 202 includes a list format of scrollable feed items that are regularly updated. For example, the feed items can include information shared by other users, notification of noteworthy activities and events, content provided by the content provider, etc. Feed item 204 includes a video advertisement. In an exemplary embodiment, the video advertisement was pushed or targeted to Erin (e.g., by targeted content component 112) because Erin was selected as a prime candidate user that can provide a valuable endorsement for the video advertisement. The video advertisement 204 is associated with various sharing/endorsement utilities 206 that allow Erin to endorse the video advertisement. For example, these sharing/endorsement utilities 206 include an option to like the video, an option to share the video, an option to comment on the video, and an option to subscribe to the video (or subscribe to an entity affiliated with the video).

If Erin were to endorse the video advertisement (e.g., using one or more of the sharing/endorsement utilities 206), the endorsement could be used to generate a social annotation that can be presented with the video advertisement when shown to users included in Erin's "audience," (wherein Erin's audience includes those users Erin has authorized to receive information regarding her endorsement of content). Erin was selected as a prime candidate endorser for the video based at least in part on her audience size and/or distribution. The specific mechanisms via which selection of Erin is based are described supra with respect to user identification component 106, audience component 108, and user selection component 110. In an aspect, the video advertisement would not have been presented to Erin if she was not selected as a prime endorsement candidate (e.g., via user selection component 110).

Recommended section 208 includes various content that has been recommended to Erin. Recommended section 208 particularly demonstrates inclusion of social annotations with content items. In particular, content item 210 includes a video that has been recommended to Erin. A social annotation 212 is associated with the video and indicates that Erin's friends Tom, Amy, Beth, and Joe liked the video. In another example, content item 214 includes an advertisement that also includes a social annotation 216 indicating more than 20 of Erin's friends liked the advertisement. By including such social annotations on content items that indicate other users in Erin's social network or networks that have endorsed the content items, Erin will be more inclined to select the content items.

Figure 3:
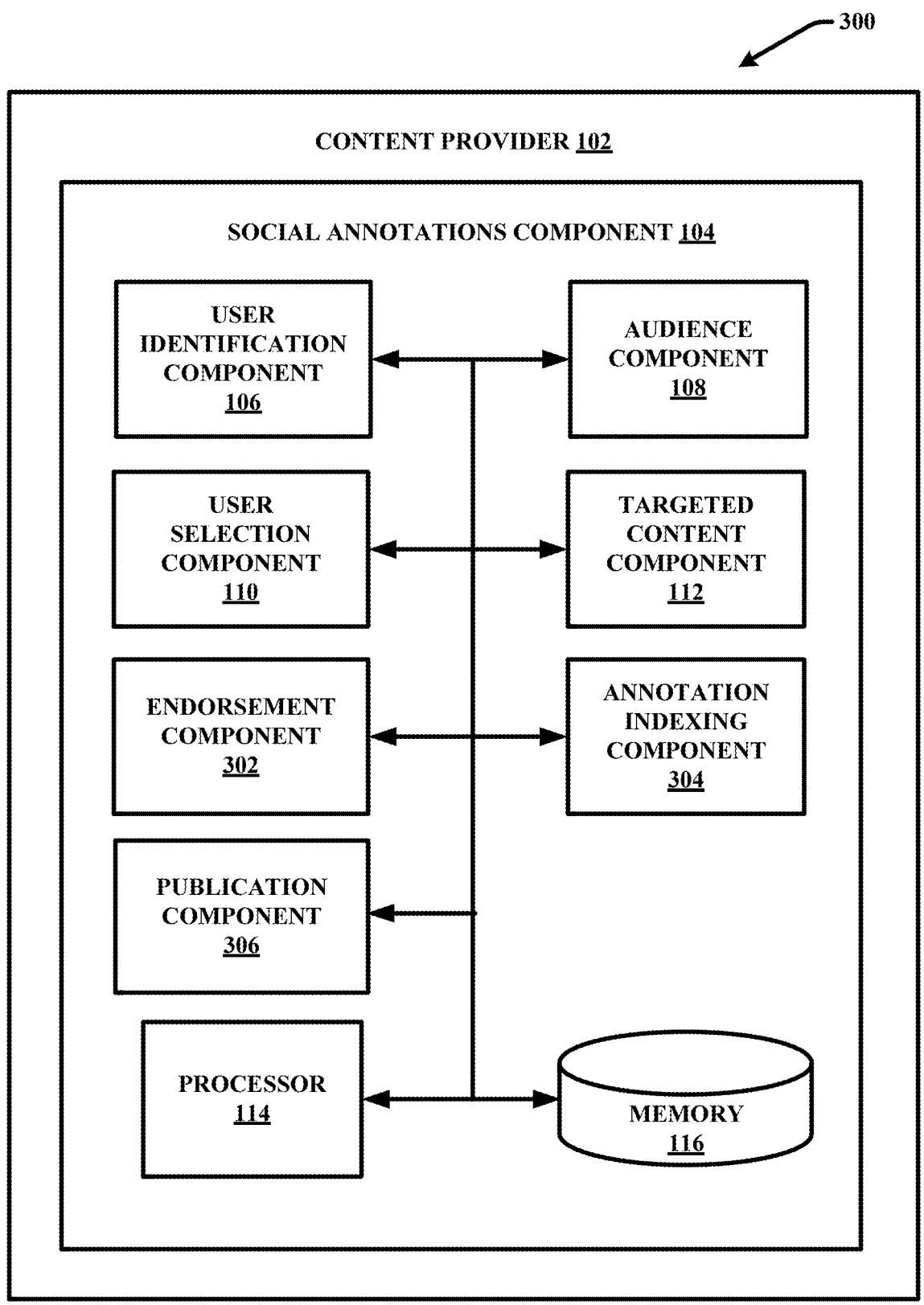
FIG. 3 illustrates a high-level block diagram of an example system that facilitates receiving user endorsements for a content item that have a relatively high social annotation value and employing the user endorsements to generate a social annotation for the content item, in accordance with certain embodiments of this disclosure.

Referring now to FIG. 3, presented is an example system 300 that facilitates receiving user endorsements for a content item that have a relatively high social annotation value, and employing the user endorsements to generate a social annotation for the content item, in accordance with certain embodiments of this disclosure. System 300 includes same or similar features and functionality as system 100 with the addition of endorsement component 302, annotation indexing component 304, and publication component 306 to social annotations component 104. Repetitive description of like elements employed in respective embodiments of systems and processes described herein is omitted for sake of brevity.

Endorsement component 302 is configured to receive information identifying an endorsement of a content item provided to a targeted user by targeted content component 112. For example, endorsement component 302 can receive information indicating that a targeted user endorsed a content item in response to endorsement of the content item by the targeted user. The information can identify the content item and the type of endorsement provided by the targeted user. For example, the information can indicate that the user performed at least one of the following actions: liked the content item, shared the content item, commented on the content item, reviewed the content item, or rated the content item (e.g., with a positive rating). In some aspects, endorsement component 302 can receive information regarding implicit user actions, and characterize such actions as an indication of endorsement of the content item. For example, endorsement component 302 can consider mere viewing or selection of the content item (e.g., watching a video, repeatedly watching the video) as an indication of endorsement of the content item by the user. In another example, when a content item includes a hyperlink, endorsement component 302 can consider selection of the hyperlink as an indication of endorsement of the content item by the user.

Annotation indexing component 304 is configured to associate information with a content item that identifies users that have endorsed the content item. Annotation indexing component 304 can also associate information with the respective users that have endorsed the content item that identifies their respective audiences. In some aspects, indexing component 304 can include information with the users indicting the type of endorsement they respectively provided for the content item (e.g., liked, shared, selected, watched, etc.). In various additional aspects, annotation indexing component 304 can include information with respective audience members of a user that indicates a social network or networks via which the respective audience members are affiliated with the user associated with the audience (e.g., when the audience includes members from different social networks).

Publication component 306 is configured to employ information indexed by annotation indexing component 304 and apply a social annotation (e.g., social annotations 212 and 216) to a content item in association with presentation of the content item to a user. The social annotation will include one or more other users that have endorsed the content item and that are associated with the user (e.g., a friend, a follower, an acquaintance) via one or more social networks. For example, when content provider 102 presents the content item to a particular user, publication component 306 can employ information associated with the content item by annotation indexing component 304 that identifies users that have endorsed the content item and their respective audiences. Publication component 306 can identify audiences (if any) that the particular user is a member of and then identify the respective users (e.g., the endorsers) associated with those audiences. Publication component 306 can then generate and include a social annotation with the content item that identifies or describes the respective users. For example, the social annotation can include information listing the names of the users as people who have endorsed the content item.

In various embodiments, social annotations can accompany a content item in association with a post on a user's social networking profile, a post on a user's social networking feed (e.g., blog), a post on a webpage (e.g., a video sharing website), a notification to be sent to other users, an in-stream video, and the like. As such, annotations can take many forms such as likes, plus ones, and textual commentary to name a few. In an aspect, appropriate selection of targeted users can facilitate generation of highly visible annotations, increase performance, and increased user satisfaction.

In one or more embodiments, publication component 306 can include a social annotations with a content item that is presented in association with various social networks, including social networks provided by content provider 102 and other entities. The social annotation can further reflect the source at which the content item is published. For example, if a content item is published to a particular user at a first social networking source, the social annotations associated with the content item can include a set of members of the first social networking source that are affiliated with the particular user at the first networking source. Likewise, if a content item is published to a particular user at a second social networking source, the social annotations associated with the content item can include a set of members of the second social networking source that are affiliated with the particular user at the first networking source. Still in yet another aspect, regardless of the source to which a content item is published, the social annotations associated therewith can come from users of different social networks.

In an aspect, publication of an annotation with a content item can include posting, generating notifications, or otherwise disseminating annotations. In another aspect, destinations can include social network sites, other websites, servers, mobile devices, electronic mailboxes, and the like. For example, publication component 306 can upload an annotation to an application server, social network server, or the like. In another aspect, publication component 306 can generate messages or notifications and can transmit the messages or notifications to users. For example, a user can respond to a targeted invitation. An annotation can be generated based on the response and the annotation can be sent in a message or notification. In some embodiments, publication component 306 can select users to and transmit the annotation to the selected users.

In some aspects, publication component 306 can generate social annotations in different forms based on the identified destination for a content item/annotation. In some embodiments, publication component 306 can generate annotations based on appropriate formats. For example, a response to be published on a social networking site can have a different format than a response to be published to other networks (e.g., mobile application purchasing sites).

In another aspect, publication component 306 can publish annotations to social networks or services that are not explicitly relate to a user associated with the annotations. For example, a target user can endorse a content item and the endorsement can be used to generate an annotation that can be published on websites or other entities. In one example, the annotation can be published or utilized by websites or services with which the targeted user does not actively participate. In an aspect, a targeted user can provide input to allow publication component 306 to publish annotations to one or more entities that the user does not belong to or otherwise participate.

In some aspects, publication component 306 can generate social annotations in different forms based on the identified destination for a content item/annotation. In some embodiments, publication component 306 can generate annotations based on appropriate formats. For example, a response to be published on a social networking site can have a different format than a response to be published to other networks (e.g., mobile application purchasing sites).

Figure 4:
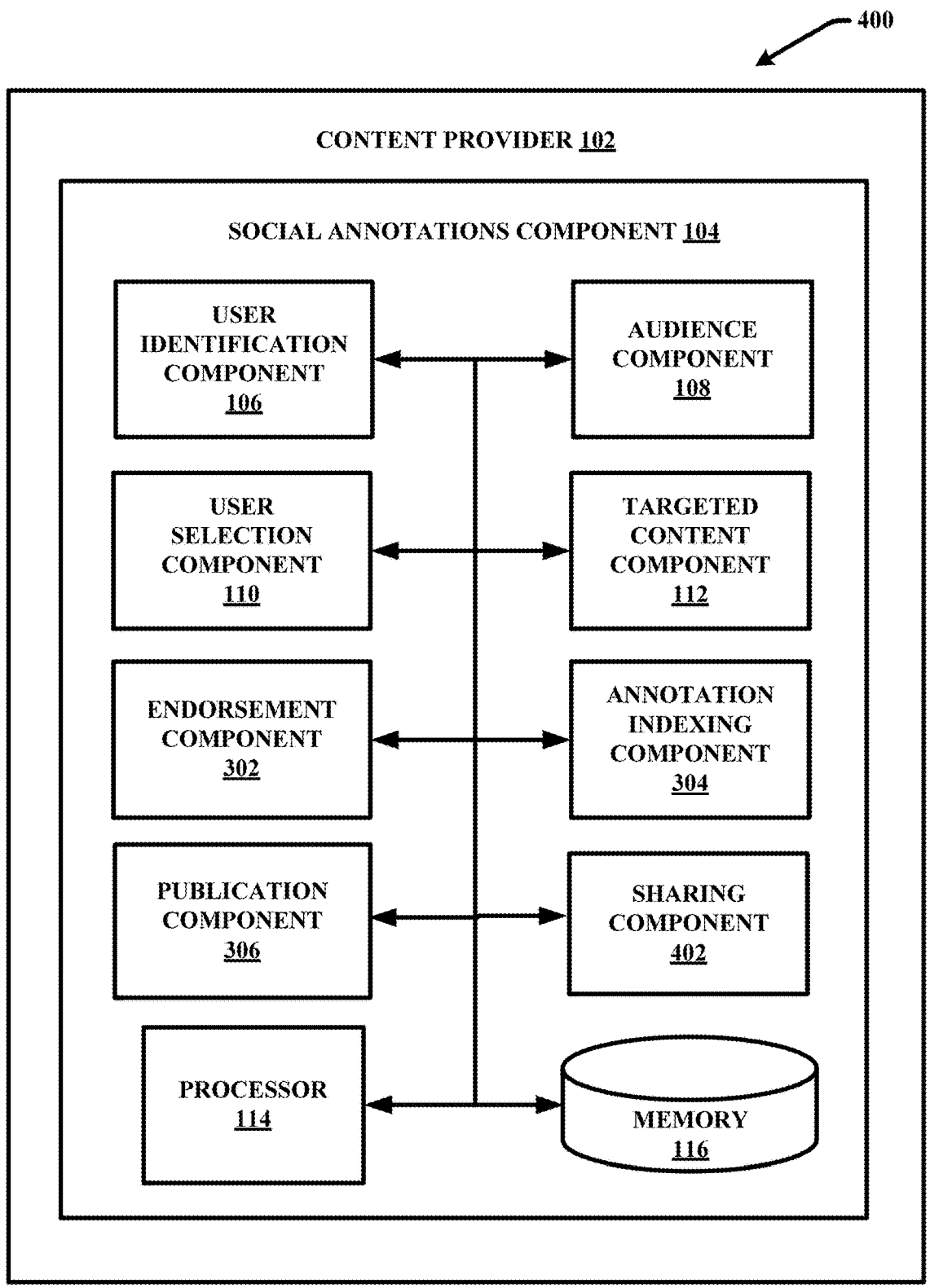
FIG. 4 illustrates a high-level block diagram of another example system that facilitates receiving user endorsements for a content item that have a relatively high social annotation value and employing the user endorsements to generate a social annotation for the content item, in accordance with certain embodiments of this disclosure.

Referring now to FIG. 4, presented is an example system 400 that facilitates receiving user endorsements for a content item that have a relatively high social annotation value, and employing the user endorsements to generate a social annotation for the content item, in accordance with certain embodiments of this disclosure. System 400 includes same or similar features and functionality as system 300 with the addition of sharing component 402. Repetitive description of like elements employed in respective embodiments of systems and processes described herein is omitted for sake of brevity.

Sharing component 402 component is configured to perform various actions based on a user's sharing settings in association with promoting valuable user endorsements. In an aspect, sharing settings can be configured based on a user input. For example, sharing component 402 can render a set of sharing settings that can be altered based on user input. In some aspects, sharing component 402 can apply a default sharing setting for users who have not manually configured sharing settings. It is noted that sharing settings can be stored, accessed, or otherwise maintained by sharing component 402.

In an embodiment, sharing component 402 can determine whether a user has altered, viewed, or otherwise interacted with sharing settings. For example, sharing component 402 can determine whether a user has interacted with sharing or privacy settings based on stored user actions and/or differences between a default sharing setting and a user's sharing settings. In various embodiments, sharing component 402 is configured to generate a prompt that requests a user to provide input to alter a sharing setting to a less restrictive setting. For example, sharing component 402 can be configured to send a request to a user asking the user to alter his or her privacy setting regarding visibility of user endorsements to a less restrictive setting (e.g., from private to public, or from private to a defined group of users) in response to a determination that the sharing setting is set to private.

In one or more embodiments, user identification component 106 can be configured to select users that have not yet interacted with sharing settings. The selected users can be candidates for receiving or being presented with targeted content. For example, the user identification component 106 can be configured to identify a potential candidate user based on a determination that the sharing setting for the potential candidate user is set to a default value. The sharing component 402 can in turn be configured to, in response to the determination that the sharing setting is set to a default value, prompt the user to adjust the sharing setting to indicate a broader criteria required for users authorized to receive information indicating content endorsed by the user.

Figure 5:
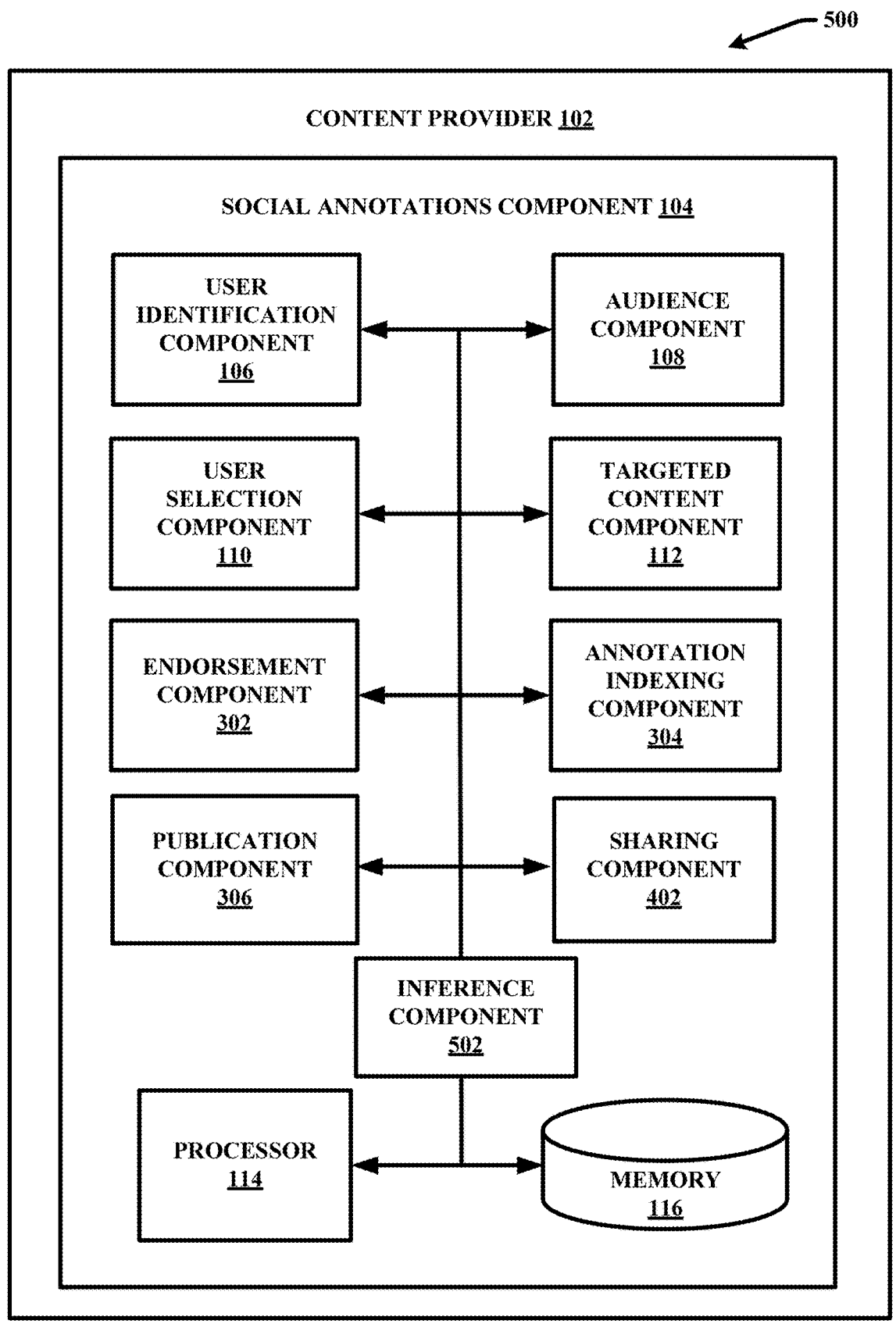
FIG. 5 illustrates a high-level block diagram of another example system that facilitates receiving user endorsements for a content item that have a relatively high social annotation value and employing the user endorsements to generate a social annotation for the content item, in accordance with certain embodiments of this disclosure.

Referring now to FIG. 5, presented is an example system 500 that facilitates receiving user endorsements for a content item that have a relatively high social annotation value, and employing the user endorsements to generate a social annotation for the content item, in accordance with certain embodiments of this disclosure. System 500 includes same or similar features and functionality as system 300 with the addition of inference component 502. Repetitive description of like elements employed in respective embodiments of systems and processes described herein is omitted for sake of brevity.

Inference component 502 is configured to provide for or aid in various inferences or determinations associated with aspects of social annotations component 104. Moreover, inference component 502 may be granted access to all or portions of other components such as those of systems 100, 300, etc.

In an aspect, inference component 502 can generate inferences associated with candidate users. The inferences can include probabilities as to whether a user will provide a content endorsement, an estimate number of users that will actually view the content item and converge on a social annotation generated based on the user's content endorsement, and the like. In one aspect, the user selection component 110 can determine whether to select users based on inferences provided by the inference component 502. For example, a user can be selected if an estimate number of users that will actually view a response meets a threshold number. In another example, a user can be selected based on a probability associated with the user viewing or otherwise accessing targeted content.

In order to provide for or aid in the numerous inferences described herein, inference component 502 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 6:
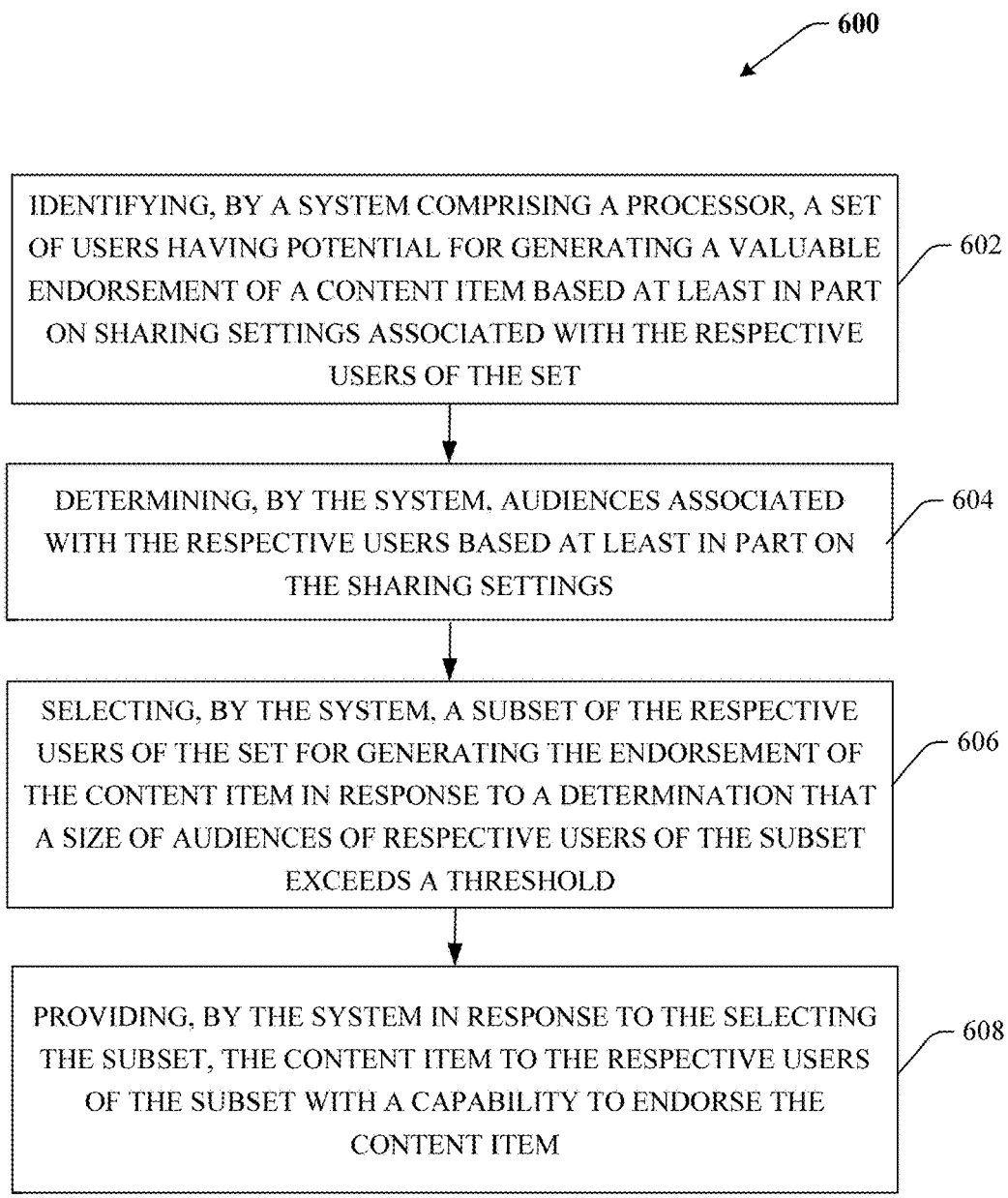
FIG. 6 illustrates a flow diagram of an example method for receiving user endorsements for a content item that have a relatively high social annotation value, in accordance with certain embodiments of this disclosure.
Figure 7:
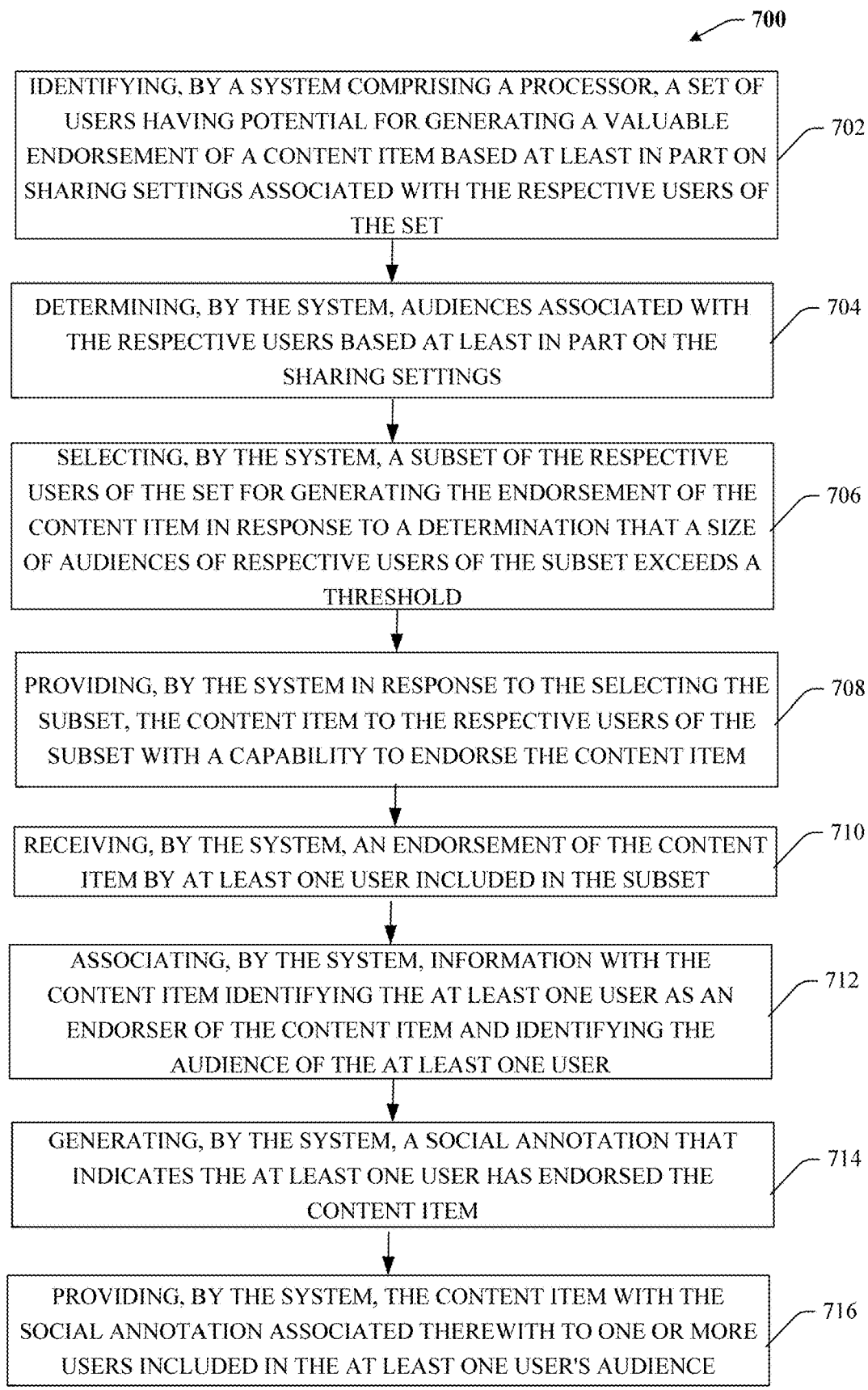
FIG. 7 illustrates a flow diagram of another example method for receiving user endorsements for a content item that have a relatively high social annotation value, in accordance with certain embodiments of this disclosure.
Figure 8:
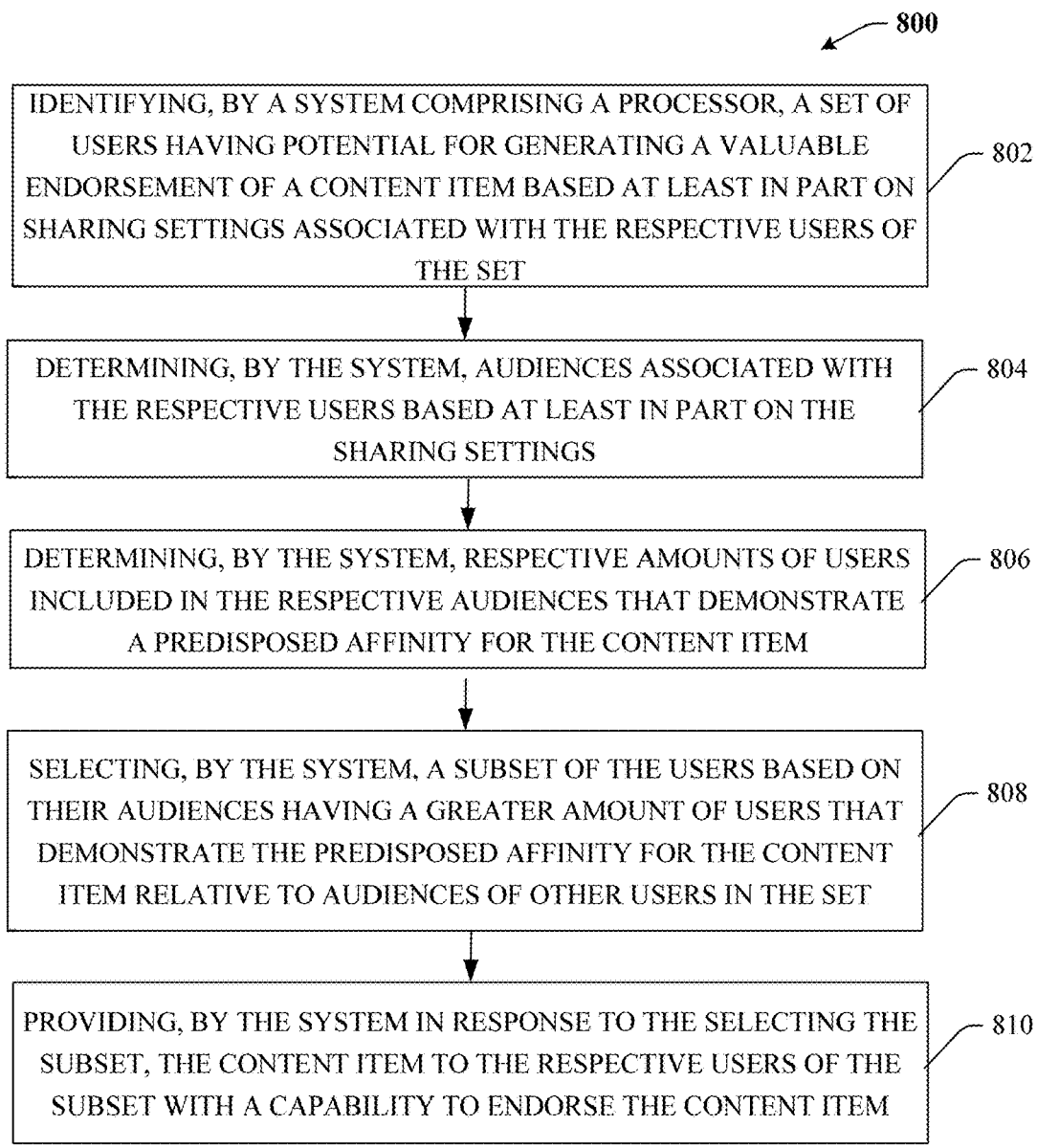
FIG. 8 illustrates a flow diagram of an example method for receiving user endorsements for a content item that have a relatively high social annotation value and employing the user endorsements to generate a social annotation for the content item, in accordance with certain embodiments of this disclosure.

FIGS. 6-8 illustrate various methodologies in accordance with certain embodiments of this disclosure. While, for purposes of simplicity of explanation, the methodologies are shown media a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media. It is noted that the methods depicted in FIGS. 6-8 can be performed by various systems disclosed herein, such as systems 100, 300, 400 and 500.

FIG. 6 illustrates an example method 600 for receiving user endorsements for a content item that have a relatively high social annotation value, in accordance with certain embodiments of this disclosure. Repetitive description of like elements employed in respective embodiments of system and methods described herein is omitted for sake of brevity.

At 602 a set of users having potential for generating a valuable endorsement of a content item is identified based at least in part on a sharing settings associated with respective users of the set (e.g., via user identification component 106). The sharing settings indicate one or more criteria required for users authorized to receive information indicating content endorsed by the respective users. At 604, audiences associated with the respective users are determined based at least in part on the sharing settings (e.g., via audience component 108). At 606, a subset of the respective users of the set is selected for generating the endorsement of the content item in response to a determination that a size of audiences of respective users of the subset exceeds a threshold (e.g., via user selection component 110). At 608, in response to the selecting the subset, the content item is provided to the respective users of the subset with a capability to endorse the content item (e.g., via targeted content component 112).

FIG. 7 illustrates an example method 700 for receiving user endorsements for a content item that have a relatively high social annotation value and employing those endorsements to generate social annotations, in accordance with certain embodiments of this disclosure. Repetitive description of like elements employed in respective embodiments of system and methods described herein is omitted for sake of brevity.

At 702 a set of users having potential for generating a valuable endorsement of a content item is identified based at least in part on a sharing settings associated with respective users of the set (e.g., via user identification component 106). The sharing settings indicate one or more criteria required for users authorized to receive information indicating content endorsed by the respective users. At 704, audiences associated with the respective users are determined based at least in part on the sharing settings (e.g., via audience component 108). At 706, a subset of the respective users of the set is selected for generating the endorsement of the content item in response to a determination that a size of audiences of respective users of the subset exceeds a threshold (e.g., via user selection component 110). At 708, in response to the selecting the subset, the content item is provided to the respective users of the subset with a capability to endorse the content item.

At 710 an endorsement of the content item is received by at least one user included in the subset (e.g., via endorsement component 302). At 712, information is associated with the content item identifying the at least one user as an endorser of the content item and identifying the audience of the at least one user (e.g., via annotation indexing component 304). At 714 a social annotation is generated by the system (e.g., via publication component 306) that indicates the at least one user has endorsed the content item. At 716, the content item is provided by the system, with the social annotation associated therewith, to one or more users included in the at least one user's audience.

FIG. 8 illustrates another example method 800 for receiving user endorsements for a content item that have a relatively high social annotation value, in accordance with certain embodiments of this disclosure. Repetitive description of like elements employed in respective embodiments of system and methods described herein is omitted for sake of brevity.

At 802 a set of users having potential for generating a valuable endorsement of a content item is identified based at least in part on a sharing settings associated with respective users of the set (e.g., via user identification component 106). The sharing settings indicate one or more criteria required for users authorized to receive information indicating content endorsed by the respective users. At 804, audiences associated with the respective users are determined based at least in part on the sharing settings (e.g., via audience component 108). At 606, respective amounts of users included in the respective audiences that demonstrate a predisposed affinity for the content item are determined (e.g., via audience component 108). At 608 a subset of the users are selected by the system based on their audiences having a greater amount of users that demonstrate the predisposed affinity for the content item relative to audiences of other users in the set (e.g., via user selection component 110). At 610, in response to the selecting the subset, the content item is provided to the respective users of the subset with a capability to endorse the content item (e.g., via targeted content component 112).

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
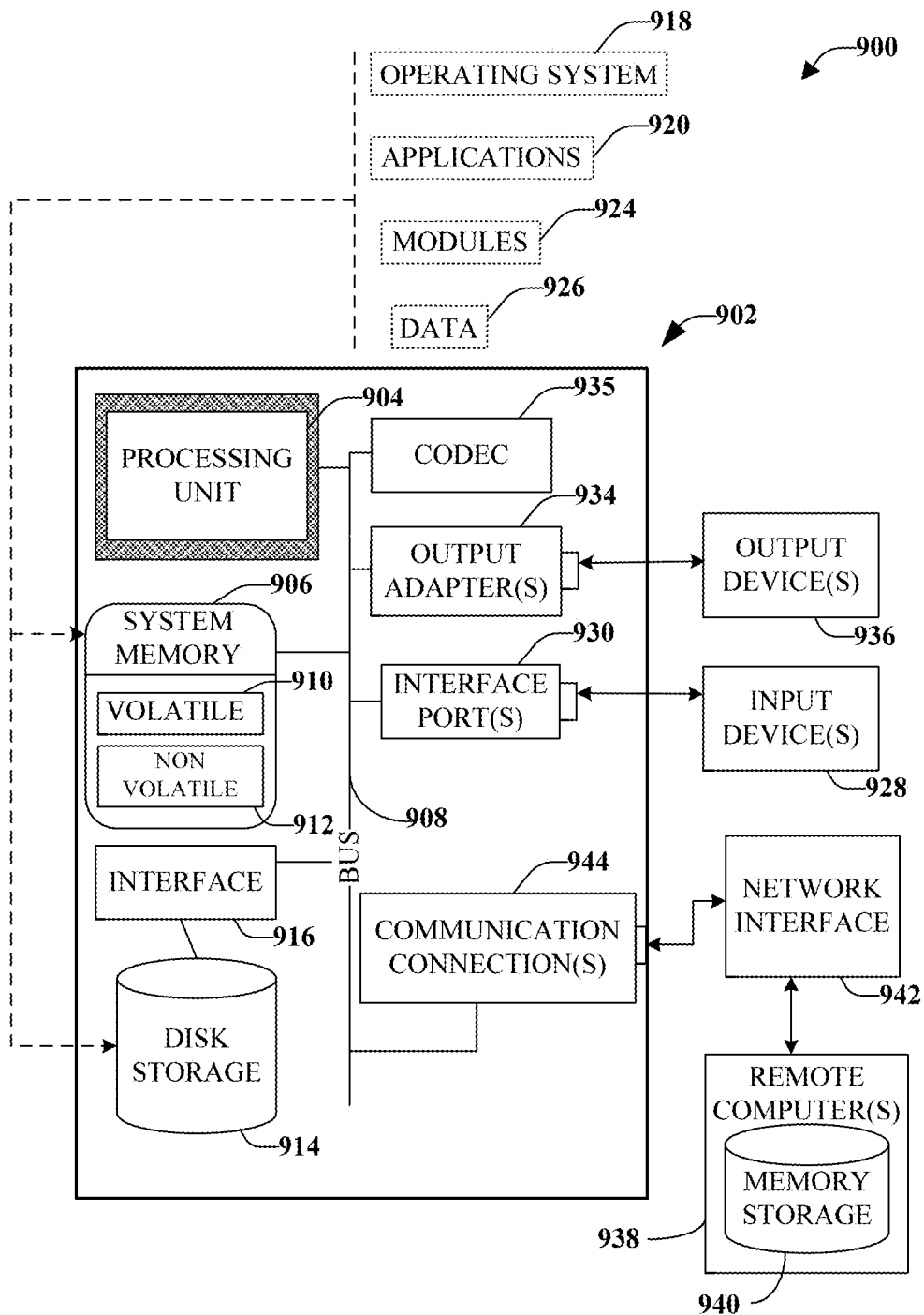
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. Although, codec 935 is depicted as a separate component, codec 935 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can be provided the opportunity to opt-in or opt-out of having such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
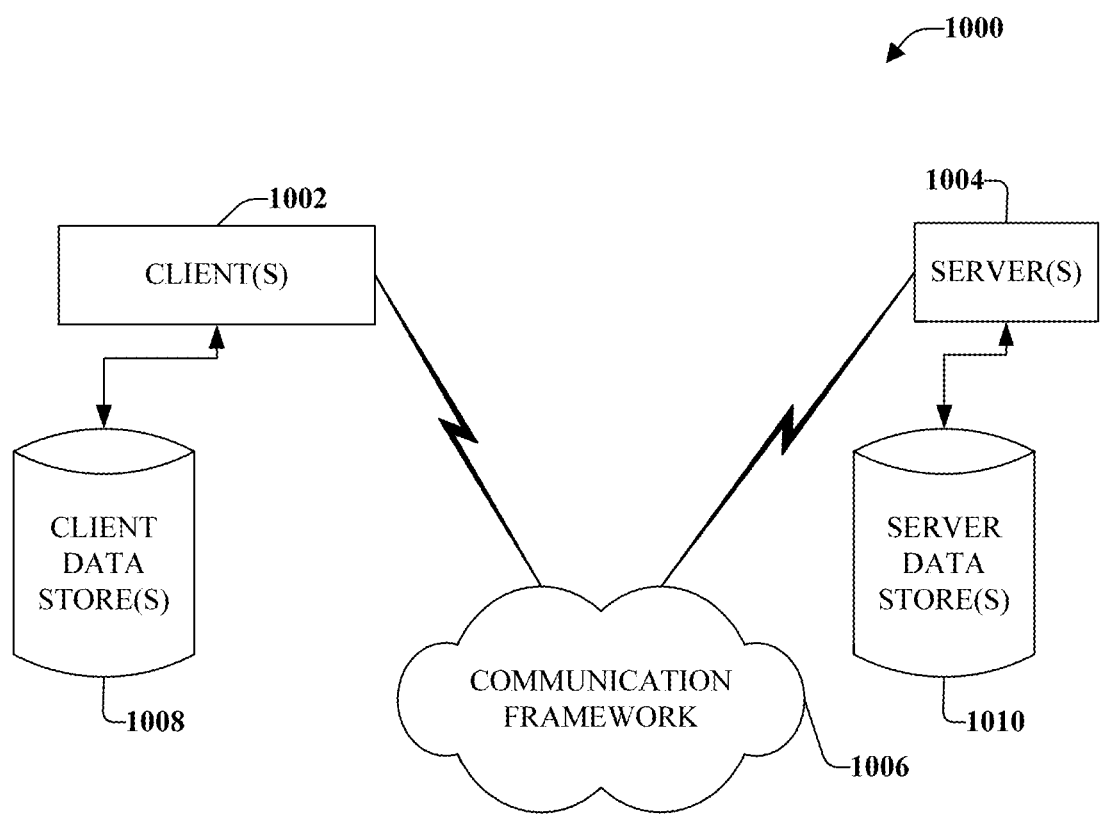
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A method comprising:
   determining whether to select a user as a candidate user for generating an endorsement of a content item by:
      determining a size of an audience associated with the user, wherein the size of the audience is related to a quantity of users that have requested to receive information indicating that content has been endorsed by the user;
      determining a probability of endorsement of the content item by the user based on interests of the user and a type of content of the content item; and
      selecting the user as the candidate user for generating the endorsement of the content item based on a number of users included in the audience having an affinity for the content item exceeding a predetermined threshold and the probability of the endorsement by the user; and
   causing an invitation with the content item to be presented to the user, wherein the invitation prompts the user to endorse the content item.

2. The method of claim 1, wherein the user is selected as the candidate user based at least in part on a capability of the user to endorse the content item, wherein the capability to endorse the content item includes at least one of: an ability to mark the content item as liked, an ability to share the content item, and an ability to comment on the content item.

3. The method of claim 1, wherein the user is selected as the candidate user based at least in part on a sharing setting associated with the user, wherein the sharing setting indicates one or more criteria required for users other than the user to be authorized to receive information indicating that content has been endorsed by the user.

4. The method of claim 3, wherein the size of the audience is determined based at least in part on the sharing setting and a characteristic of the content item and wherein the quantity of users is determined based on the one or more criteria.

5. The method of claim 1, further comprising determining a value of endorsement of the content item by the user based on the size of the audience associated with the user and the probability of endorsement of the content item by the user, wherein the value of endorsement of the content item by the user indicates a number of users included in the audience who will view the content item based on seeing an indication of the endorsement of the content item by the user and wherein the user is selected as the candidate user for generating the endorsement of the content item based on the value of endorsement of the content item by the user.

6. The method of claim 1, wherein size of the audience is determined by determining the audience based on social networks respectively established by the user.

7. The method of claim 1, further comprising:
   determining an amount of users included in the audience that demonstrate a predisposed affinity for the content item; and
   selecting the user based on the amount of users that demonstrate the predisposed affinity for the content item.

8. The method of claim 1, further comprising:
receiving engagement information regarding engagement of respective audience members of the audience; and
selecting the user based on the engagement information.

9. The method of claim 1, further comprising:
selecting the user based on an endorsement history of the user, wherein the endorsement history identifies at least one of: a frequency with which content has been endorsed, a characteristic of content endorsed, and a type of content endorsement frequently provided.

10. The method of claim 1, further comprising:
receiving an endorsement of the content item by the user;
associating information with the content item identifying the user as an endorser of the content item and identifying the audience of the user; and
generating a social annotation that indicates the user has endorsed the content item.

11. A system comprising:
a memory having stored thereon computer executable instructions; and
a processor that, when executing the computer executable instructions, is configured to:
determine whether to select a user as a candidate user for generating an endorsement of a content item by:
determining a size of an audience associated with the user, wherein the size of the audience is related to a quantity of users that have requested to receive information indicating that content has been endorsed by the user;
determining a probability of endorsement of the content item by the user based on interests of the user and a type of content of the content item; and
selecting the user as the candidate user for generating the endorsement of the content item based on a number of users included in the audience having an affinity for the content item exceeding a predetermined threshold and the probability of the endorsement by the user; and
cause an invitation with the content item to be presented to the user, wherein the invitation prompts the user to endorse the content item.

12. The system of claim 11, wherein the user is selected as the candidate user based at least in part on a capability of the user to endorse the content item, wherein the capability to endorse the content item includes at least one of: an ability to mark the content item as liked, an ability to share the content item, and an ability to comment on the content item.

13. The system of claim 11, wherein the user is selected as the candidate user based at least in part on a sharing setting associated with the user, wherein the sharing setting indicates one or more criteria required for users other than the user to be authorized to receive information indicating that content has been endorsed by the user.

14. The system of claim 13, wherein the size of the audience is determined based at least in part on the sharing setting and a characteristic of the content item and wherein the quantity of users is determined based on the one or more criteria.

15. The system of claim 11, wherein the processor is further configured to determine a value of endorsement of the content item by the user based on the size of the audience associated with the user and the probability of endorsement of the content item by the user, wherein the value of endorsement of the content item by the user indicates a number of users included in the audience who will view the content item based on seeing an indication of the endorsement of the content item by the user and wherein the user is selected as the candidate user for generating the endorsement of the content item based on the value of endorsement of the content item by the user.

16. The system of claim 11, wherein size of the audience is determined by determining the audience based on social networks respectively established by the user.

17. The system of claim 11, wherein the processor is further configured to:
determine an amount of users included in the audience that demonstrate a predisposed affinity for the content item; and
select the user based on the amount of users that demonstrate the predisposed affinity for the content item.

18. The system of claim 11, wherein the processor is further configured to:
receive engagement information regarding engagement of respective audience members of the audience; and
select the user based on the engagement information.

19. The system of claim 11, wherein the processor is further configured to:
select the user based on an endorsement history of the user, wherein the endorsement history identifies at least one of: a frequency with which content has been endorsed, a characteristic of content endorsed, and a type of content endorsement frequently provided.

20. The system of claim 11, wherein the processor is further configured to:
receive an endorsement of the content item by the user;
associate information with the content item identifying the user as an endorser of the content item and identifying the audience of the user; and
generate a social annotation that indicates the user has endorsed the content item.

21. A non-transitory computer-readable medium containing computer executable instructions that, when executed by a processor, cause the processor to perform a method, the method comprising:
determining whether to select a user as a candidate user for generating an endorsement of a content item by:
determining a size of an audience associated with the user, wherein the size of the audience is related to a quantity of users that have requested to receive information indicating that content has been endorsed by the user;
determining a probability of endorsement of the content item by the user based on interests of the user and a type of content of the content item; and
selecting the user as the candidate user for generating the endorsement of the content item based on a number of users included in the audience having an affinity for the content item exceeding a predetermined threshold and the probability of the endorsement by the user; and
causing an invitation with the content item to be presented to the user, wherein the invitation prompts the user to endorse the content item.

* * * * *